(12) United States Patent
Meggers et al.

(10) Patent No.: US 10,718,670 B2
(45) Date of Patent: Jul. 21, 2020

(54) SPHERICAL-MOTION AVERAGE RADIANT TEMPERATURE SENSOR

(71) Applicant: THE TRUSTEES OF PRINCETON UNIVERSITY, Princeton, NJ (US)

(72) Inventors: Forrest Meggers, Princeton, NJ (US); Eric Teitelbaum, Princeton, NJ (US); Jake Read, Toronto (CA)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 263 days.

(21) Appl. No.: 15/559,218

(22) PCT Filed: Mar. 23, 2016

(86) PCT No.: PCT/US2016/023735
§ 371 (c)(1),
(2) Date: Sep. 18, 2017

(87) PCT Pub. No.: WO2016/154282
PCT Pub. Date: Sep. 29, 2016

(65) Prior Publication Data
US 2018/0073930 A1    Mar. 15, 2018

Related U.S. Application Data

(60) Provisional application No. 62/170,410, filed on Jun. 3, 2015, provisional application No. 62/136,893, filed on Mar. 23, 2015.

(51) Int. Cl.
*G01J 5/00* (2006.01)
*G01J 5/08* (2006.01)
(Continued)

(52) U.S. Cl.
CPC ............. *G01J 5/089* (2013.01); *G01J 5/0003* (2013.01); *G01J 5/0025* (2013.01); *G01J 5/02* (2013.01);
(Continued)

(58) Field of Classification Search
CPC ...... G01J 5/00; G01J 5/02; G01J 5/089; G01J 5/026; G01J 5/025
(Continued)

(56) References Cited

U.S. PATENT DOCUMENTS 3,596,153 A * 7/1971 Brainard ............. G05B 19/251
318/574
3,933,044 A    1/1976 Loper et al.
(Continued)

FOREIGN PATENT DOCUMENTS

CN    108469234 A  *  8/2018
WO    2014185033 A1    11/2014

OTHER PUBLICATIONS

Teitelbaum et al. "Mapping Comfort with the SMART (Spherical Motion Average Radiant Temperature) Sensor" In Proceedings of the 15th IBPSA Conference, San Francisco, CA, USA, Aug. 7-9, 2017.
(Continued)

*Primary Examiner* — Gail Kaplan Verbitsky
(74) *Attorney, Agent, or Firm* — Meagher Emanuel Laks Goldberg & Liao, LLP.

(57) ABSTRACT

A mean radiant temperature sensor is used to measure radiant heat exchange to determine comfort. Disclosed herein are a spherical-motion average radiant temperature sensor (SMART Sensor) device or system, and an associated method, for taking an average overall global reading while also being able to record weighting for different directions easily in spherical coordinates.

21 Claims, 6 Drawing Sheets

(51) Int. Cl.
*G01K 1/14* (2006.01)
*G01K 3/06* (2006.01)
*G01K 1/04* (2006.01)
*G01J 5/02* (2006.01)
*G01J 5/04* (2006.01)

(52) U.S. Cl.
CPC ............... *G01J 5/025* (2013.01); *G01J 5/028* (2013.01); *G01J 5/047* (2013.01); *G01J 5/0806* (2013.01); *G01J 5/0809* (2013.01); *G01K 1/045* (2013.01); *G01K 1/14* (2013.01); *G01K 3/06* (2013.01)

(58) Field of Classification Search
USPC ............................... 374/121, 124; 250/338.1
See application file for complete search history.

(56) References Cited

U.S. PATENT DOCUMENTS

| | | | | |
|---|---|---|---|---|
| 4,164,869 A * | 8/1979 | Benzinger | ................ | G01J 5/20 236/6 |
| 4,433,923 A * | 2/1984 | Rascati | .................. | G01W 1/17 340/584 |
| 4,747,699 A * | 5/1988 | Kobayashi | ............. | G01W 1/17 374/109 |
| 4,890,932 A * | 1/1990 | Kobayashi | ............. | G01W 1/17 236/44 E |
| 5,073,824 A * | 12/1991 | Vertin | .................... | F16M 11/08 348/211.2 |
| 5,105,366 A * | 4/1992 | Beckey | ................ | F24F 11/0009 165/224 |
| 5,333,784 A | 8/1994 | Pompei | | |
| 5,444,241 A * | 8/1995 | Del Grande | .......... | G01N 25/72 250/253 |
| 5,483,068 A * | 1/1996 | Moulton | .............. | G01J 5/0003 250/334 |
| 5,528,038 A | 6/1996 | Yoshiike et al. | | |
| 5,567,939 A * | 10/1996 | Hong | ..................... | F16M 11/14 250/338.1 |
| 5,734,335 A * | 3/1998 | Brogi | .................. | G08B 17/005 340/539.25 |
| 6,376,812 B2 * | 4/2002 | Yamada | .............. | H05B 6/6455 219/412 |
| 6,439,764 B1 * | 8/2002 | Engering | ............... | B23Q 17/09 374/4 |
| 6,484,619 B1 * | 11/2002 | Thomas | .................. | G01S 13/86 89/37.01 |
| 6,860,604 B1 * | 3/2005 | Vlahos | ................... | G03B 37/04 353/122 |
| 7,422,365 B2 * | 9/2008 | Chamberlain | ............ | G01J 5/10 250/338.1 |
| 8,953,022 B2 * | 2/2015 | McArdle | .......... | H04N 21/23412 348/46 |
| 10,335,040 B2 * | 7/2019 | Abreu | ...................... | A61B 5/01 |
| 2007/0025414 A1 * | 2/2007 | Mola | .................. | B60H 1/00371 374/115 |
| 2010/0329301 A1 * | 12/2010 | Pang | ...................... | A61B 5/015 374/121 |
| 2013/0026365 A1 * | 1/2013 | Jahnke | ................ | G01M 99/002 250/338.1 |
| 2013/0301676 A1 | 11/2013 | Chang et al. | | |
| 2014/0264023 A1 * | 9/2014 | Ruiter | ................... | G01J 5/0025 250/338.1 |
| 2015/0281774 A1 * | 10/2015 | Atkin | ............... | H04N 21/64322 725/14 |
| 2015/0312426 A1 * | 10/2015 | Schoner | ............... | G01C 15/002 235/375 |
| 2019/0209806 A1 * | 7/2019 | Allen | ..................... | G16H 20/70 |
| 2019/0225336 A1 * | 7/2019 | Myslinski | ............. | B64C 39/024 |

OTHER PUBLICATIONS

Teitelbaum et al. "Spherical Motion Average Radiant Temperature Sensor (Smart Sensor)" Sustainable Built Environment (SBE) regional conference, Zurich, Switzerland, Jun. 15-17, 2016.

Thorsson et al. "Different methods for estimating the mean radiant temperature in an outdoor urban setting" Int. J. Climatol., vol. 27, pp. 1983-1993 (2007).

NV Melexis SA: "MLX90614 family Single and Dual Zone Infra Red Thermometer in TO-39" Data sheet (retrieved 2006).

Read Jr, et al: "Thermoheliodome design, optimization and fabrication." In Proceedings of 6th International Building Physics Conference, IBPC 2015, Energy Procedia, vol. 78, pp. 273-278 (2015).

ISO 7726. "Ergonomics of the thermal environment—Instruments for measuring physical quantities." Geneva, Switzerland: International Organization for Standardization. Nov. 1998.

International Search Report and Written Opinion for International Application PCT/US2016/023735 dated May 27, 2016.

\* cited by examiner

SPHERICAL-MOTION AVERAGE RADIANT TEMPERATURE SENSOR

CROSS-REFERENCE TO RELATED APPLICATIONS

This application is a US national stage of PCT/US16/23735 filed on Mar. 23, 2016, which claims benefit of U.S. Provisional Application Nos. 62/136,893, filed Mar. 23, 2015, and 62/170,410, filed Jun. 3, 2015, which are hereby incorporated in their entirety by reference.

BACKGROUND OF THE INVENTION

In today's world, architects must design structures that take the comfort of those inside the structure into account. As all bodies exchange thermal radiation with their surroundings, architects and engineers often consider the Mean Radiant Temperature ("MRT") of a location, and how it relates to the comfort experienced by a person. The most accurate system to date requires a very costly and time consuming process involving multiple radiometers taking readings across a spectrum of wavelengths at a given location. As has been a standard practice for decades, however, those in building sciences typically measure MRT using a black-globe thermometer. A black-globe thermometer consists of a black globe with a temperature sensor probe placed in the center.

However, there are drawbacks to using a black-globe thermometer. The black-globe thermometer does not actually measure surrounding temperatures, but rather the internal thermometer or sensor simply outputs the mean temperature of the black globe surrounding it. Thus, a black-globe thermometer cannot easily provide information about the MRT of multiple parts of a location, but only the area immediately adjacent to the globe. Therefore, to capture information about a space at a given point in time, multiple black globe thermometers would be necessary. The globe can in theory have any diameter, but standardized globes are made with diameters of 0.15 m (5.9 in). Large globes are bulky and not aesthetically pleasing, but the smaller the diameter of the globe, the greater the effect is of air temperature and air velocity on the internal temperature, thus causing a reduction in the accuracy of the measurement of the MRT.

Thus, there has been a long-felt need for a single, simple cost-effective device, system, or method that can quickly and accurately measure the MRT, and provide information regarding multiple locations, that is not impacted by convection effects.

BRIEF SUMMARY OF THE INVENTION

A mean radiant temperature sensor device is disclosed, comprising a two degree-of-freedom motion system and a non-contacting temperature sensor, preferably with a known field of view. The measurements made by the sensor are directed using the two degree-of-freedom motion system such that measurements can be taken comprising all or a fraction of the surface of an imaginary sphere surrounding the device. The sensor device may include, but is not limited to, rotating servos attached to a sensor, or one or more mirrors directing radiation towards the sensor. The sensor device may also include a range finding sensor, a power supply, a microprocessor, a data storage device, or a data transceiver unit, or a protective shield with or without an opening through which the sensor measurement is directed.

The sensor device may take multiple measurements for a given set of readings, wherein the maximum number of measurements points the sensor makes between a start time and an end time is either (180/FOV)*(180/FOV) or (360/FOV)*(180/FOV) points, where FOV is the field of view, measured in degrees, of the mean radiant temperature sensor. The sensor may also be programmed to obtain data points from a geodesic distribution, recording measurements only after the sensors have traversed the FOV or any predetermined distance.

Also disclosed is a method of measuring mean radiant temperature. The method includes providing a sensor device for measuring a space, determining a first rotation angle for a two degree of freedom motion system, recording a surface temperature reading measurement from a temperature sensor at the first rotation angle, incrementing the two degree of freedom motion system by a predetermined amount, repeating the recording and incrementing steps until a predetermined number of data points have been collected or the two degree-of-freedom motion system reaches a set limit, then calculating the mean radiant temperature by employing a latitudinal and longitudinal weighting procedure to weigh the data points. The predetermined amount of incrementing may be equal to the field of view for the temperature sensor. A user may be presented with an overall measurement of the observed mean radiant temperature, and the data points may also be mapped, or plotted, in a manner desired by a user. The method may also use surface geometry information and the surface temperature measurement to determine the mean radiant temperature at substantially all positions in the space, and compile a spatial image providing a user a three-dimensional representation of the mean radiant temperature/surface temperature profile of the space. Alternatively, the weighting can occur for a standard sphere and/or elongated to an ellipsoid or another shape to mimic the perception of a human body, so as to provide a user with detailed information about the space being measured. Weighting can be customized to provide information about how non-spherical bodies will perceive the radiant temperature. The method may also involve detecting or estimating at least one occupant surface temperature of at least one individual in the space, and adjusting environmental conditions in the space as a result of a determination that at least one skin temperature is not within an acceptable range.

Also disclosed is a system for measuring mean radiant temperature, comprising a non-contacting infrared temperature sensor, a first rotating component and a second rotating component, and a microprocessor. The microprocessor is adapted to direct the two rotating components such that sensor measurements can be taken comprising all or a fraction of the surface of an imaginary sphere surrounding the device. The microprocessor is also adapted to receive at least a temperature reading, determine directional information corresponding to each temperature reading, calculate a mean radiant temperature as a weighted average of the received temperature data points, and output the mean radiant temperature. This system may further include a data storage unit for storing the temperature readings and directional information, a range sensor, and/or a display.

DETAILED DESCRIPTION OF THE INVENTION

Disclosed is a mean radiant temperature sensor device, comprising a two degree-of-freedom motion system and at least a non-contacting temperature sensor. The measurements made by the sensor(s) are directed using the two degree-of-freedom motion system such that multiple measurements can be taken that comprise all or a fraction of the surface of an imaginary sphere surrounding the device. The two degree-of-freedom motion system requires a system with at least two degrees-of-freedom whether that motion relies on motion along an axis, or rotation around an axis. Although a device or system capable of operating with three or more degrees of freedom is envisioned, preferably only two degrees-of-freedom are utilized in a given device or system—for most purposes, two degrees of freedom will provide sufficient sensor coverage.

Further, the two degree-of-freedom motion system is not limited as to how the two degrees of freedom are controlled. The system may incorporate a variety of servos, motors, actuators, or other system of control. One purpose of the two degrees of freedom motion system is to alter the angles from which a signal is received by at least one sensor. For example, the sensor itself may be moved or rotated, or the sensor may be fixed in place, and a signal is bounced off reflective surfaces, such as a pair of mirrors, and directed into the sensor. In all cases, the two degree of freedom motion system adjusts the relative positions or angles of components such that the sensor can gather measurements from multiple points within a space.

Figure 1:
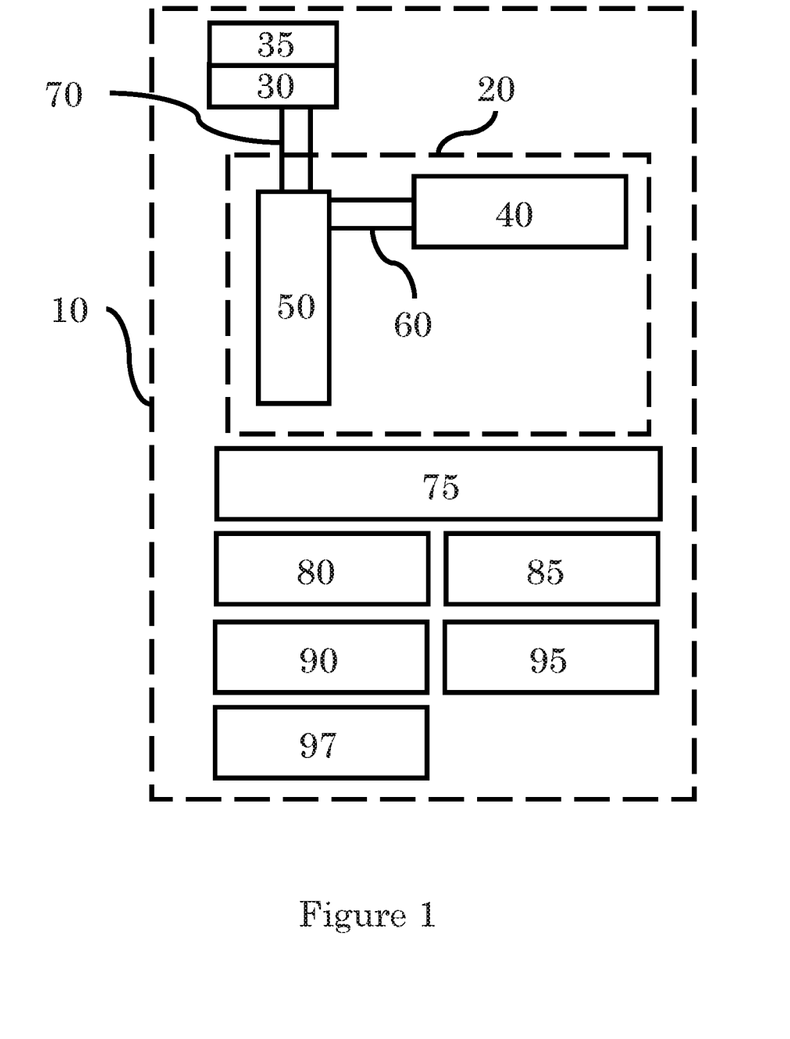
FIGS. 1-2 are block diagrams of embodiments of the present invention.

FIG. 1 is one embodiment of the present invention. The sensor device 10 may optionally be enclosed in a housing (not shown). This embodiment comprises a non-contacting temperature sensor 30 and a two degree-of-freedom motion system 20. FIG. 1 also illustrates optional features for any sensor device of the present invention, such as: at least one additional sensor 35, a display 75, a microprocessor 80, a power supply 85, a data storage device 90, a data transceiver unit 95, or an input/output connection 97. One skilled in the art will recognize that other elements may be added to provide specific desired functionality, including but not limited to keypads or switches.

In FIG. 1, the two degree-of-freedom motion system 20 comprises two servos. A first servo 40 is attached or coupled, either directly or through an arm, plate, or other mechanism 60 to a second servo 50. The second servo is then attached or coupled, either directly or through an arm, plate, or other mechanism 70 to sensor 30. The optional sensor(s) 35 can be attached or coupled to the second sensor, or to the arm, plate, or other mechanism 70, or the sensor(s) 35 may not be coupled to the two degree-of-freedom motion system at all.

The two servos should preferably generate rotation in orthogonal planes. In the embodiment disclosed in FIG. 1, servo 40 generates rotation in the y-z plane, while servo 50 generates rotation in the x-z plane. The amount of rotation each servo requires is dependent on the application. As non-limiting examples, take the following three applications. For a stand-alone unit that is intended to take measurements comprising all or substantially all of the surface of an imaginary sphere surrounding the device, a 360 degree rotating servo is preferably coupled to a 180 degree rotating servo. For a unit to be mounted along a wall in a room, a 180 degree rotating servo is preferably coupled to another 180 degree rotating servo. And for a unit intended to be mounted in a ceiling corner in a room, a 90 degree rotating servo is preferably coupled to a 90 degree rotating servo. However, other configurations of servo couplings are envisioned, depending on the application.

The sensor 30 is a non-contacting temperature sensor. Currently, the preferred embodiment of such a sensor is an infrared sensor. Generally, a sensor having a known field of view is preferred. Field of view as used in herein is interchangeable with angle of view. The field of view can be determined as $$\theta = 2\tan^{-1}\frac{w}{2d},$$

where $\theta$ is the field of view, w is a dimension of an area detected by the sensor at a distance d. The dimension measured by w depends on the configuration of the sensor. Typically, this will be a circular area, so the dimension will be the diameter. In other cases, for example, the sensor might cover a rectangular area, in which case the sensor might have two fields of view—one measured using the width of the rectangle, and one using the length of the rectangle.

While the sensor device 10 will function with a sensor 30 having any field of view, a sensor with a relatively small field of view is preferred. In one exemplary embodiment, the sensor unit comprises a 5 degree circular field of view temperature sensor, the MLX90614ESF-DCI digital non-contact infrared temperature sensor commercially available from NV Melexis SA. This sensor is mounted to two servos, a continual 360° rotating servo and a 180° servo, which allow measurement of all points on an imaginary sphere's surface with a single sensor.

Wind should have no effect on the accuracy of measurements of the disclosed sensor, since the sensor being used is a non-contacting infrared temperature sensor. This is an important feature of the disclosed approach, and allows the application of the device to expand to outdoor spaces. The single-sensor approach is cheap and effective, as the current standard of globe thermometers becomes noisy in outdoor applications when wind is present.

The sensor device 10 may also include optional sensor(s) 35. These optional sensors may include any sensor that suits a desired application. This may include, but is not limited to, a range finder, a wind speed sensor, or a humidity or pressure sensor.

While wind speed may not have an effect on the temperature sensor, a wind speed sensor may also be optionally incorporated. As is known in the art, wind speed impacts convection rates, and thus wind speeds may optionally be used to factor into algorithms or calculations used by the system.

If the sensor device is outfitted with a depth or range finder, that sensor can provide distance information to the known azimuthal and inclinational angles, which allows the space being measured to be represented in 3 dimensions. Surfaces radiant temperatures can be extracted from the overall MRT as well with this secondary piece of information.

One embodiment of the invention preferably utilizes a directional sensor as the optional sensor, where the directional sensor has a smaller field of view than the temperature sensor. In one exemplary embodiment, range finding functionality was performed by a 3° field of view LIDAR Lite sensor manufactured by PulsedLight, Inc. with a range of 0-40 m, with accuracy within 1 inch. This fits well within the 5 degree field of view of the exemplary temperature sensor.

The optional power supply 85 includes but is not limited to batteries or battery packs, solar cells, or an AC power source with an appropriate converter. If utilizing AC power, a variety of options are envisioned, depending on the configuration. These options include, but are not limited to requiring a cord to plug in to a wall outlet in some embodiments of stand-alone units, or when mounted on a wall, the device may be tied directly into a building's electrical wiring system.

While certainly a sensor device can be controlled and managed from a separate computer system, the sensor device may also involve the inclusion of an optional microprocessor 80 for allowing the sensor device to handle some or all required functions by itself.

A data storage device 90 may also be utilized with the sensor device. One skilled in the art will recognize that any appropriate storage medium is applicable here, including but not limited to RAM memory, a removable non-volatile memory card such as a Secure Digital card (SD™, SDHC™, SDXC™, or similar cards), or a hard drive or solid state drive, either connected internally, or externally through an appropriate optional input/output connection 97, such as a universal serial bus (USB) connection or ethernet connection.

A data transceiver unit 95 may optionally be incorporated into the sensor device. This data transceiver unit transmits and/or receives data from an external source. This connection with the external source may be through any acceptable means, and as such, the data transceiver unit may comprise one or more connections, including but not limited to a wireless transceiver, utilizing an appropriate protocol such as an 802.11-based protocol, and/or a network interface controller, such as those used for ethernet. If via a network interface controller is incorporated, the network interface controller may utilize the optional input/output connection 97. Further, the data transceiver unit 95 also allows for data to be stored externally, such as in a cloud-based system.

Figure 2:
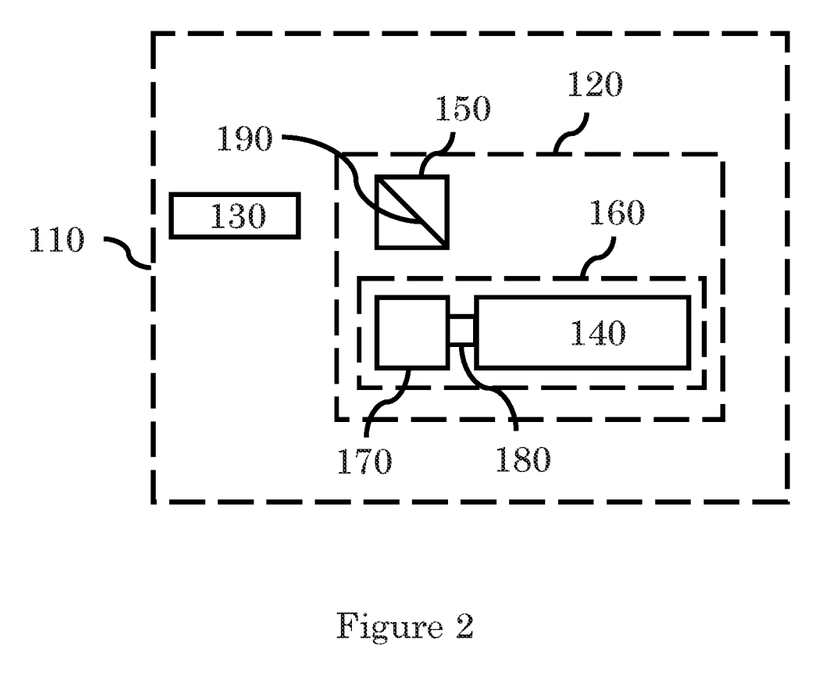

Referring now to FIG. 2, an embodiment of an alternate two degree-of-freedom motion system is illustrated. In FIG. 2, device 110 includes a sensor 130 and a two degree-of-freedom motion system 120. The system 120 includes a plurality of mirrors 170, 190, each of which are adapted to rotate around at least one unique axis. In this case, mirror 170 is attached via optional coupling 180 to a rotation unit 140 to form a rotating mirror component 160. The rotation unit 140 may be any device that allows controlled rotation around a central axis, which includes but is not limited to an electric motor. The optional coupling 180 may include, but is not limited to, a frame holding the mirror and bolted to the central drive shaft of rotation unit 140 or an extension of the drive shaft onto which mirror 170 is welded. In FIG. 2, the axis of rotation for mirror 170 is the centerline of rotation unit 140, around the x-axis. FIG. 2 also illustrates Rotating Mirror Component 150, which in this figure is considered to be identical to Rotating Mirror Component 160, except component is rotated such that the axis of rotation for mirror 190 is now the z-axis. This configuration allows the sensor device to adjust the mirrors so as to direct infrared light from emitting from or reflecting from various surfaces located in the space around the device towards the sensor.

Another variant of this system may utilize a single mirror that can be adjusted along two planes. Such a device could utilize one or more servos, or one or more actuators, coupled to the mirror. The coupling may occur in a variety of ways—for example, a first servo rotating in the x-y plane could be coupled to a second servo rotating in the y-z plane which is then coupled directly to a mirror.

These devices generally operate by taking a series of readings from around the device and making calculations based on that series of readings. A preferred embodiment calculates a mean radiant temperature through an algorithm that weights each reading, and gives directional information for mean radiant temperature influences.

Figure 3:
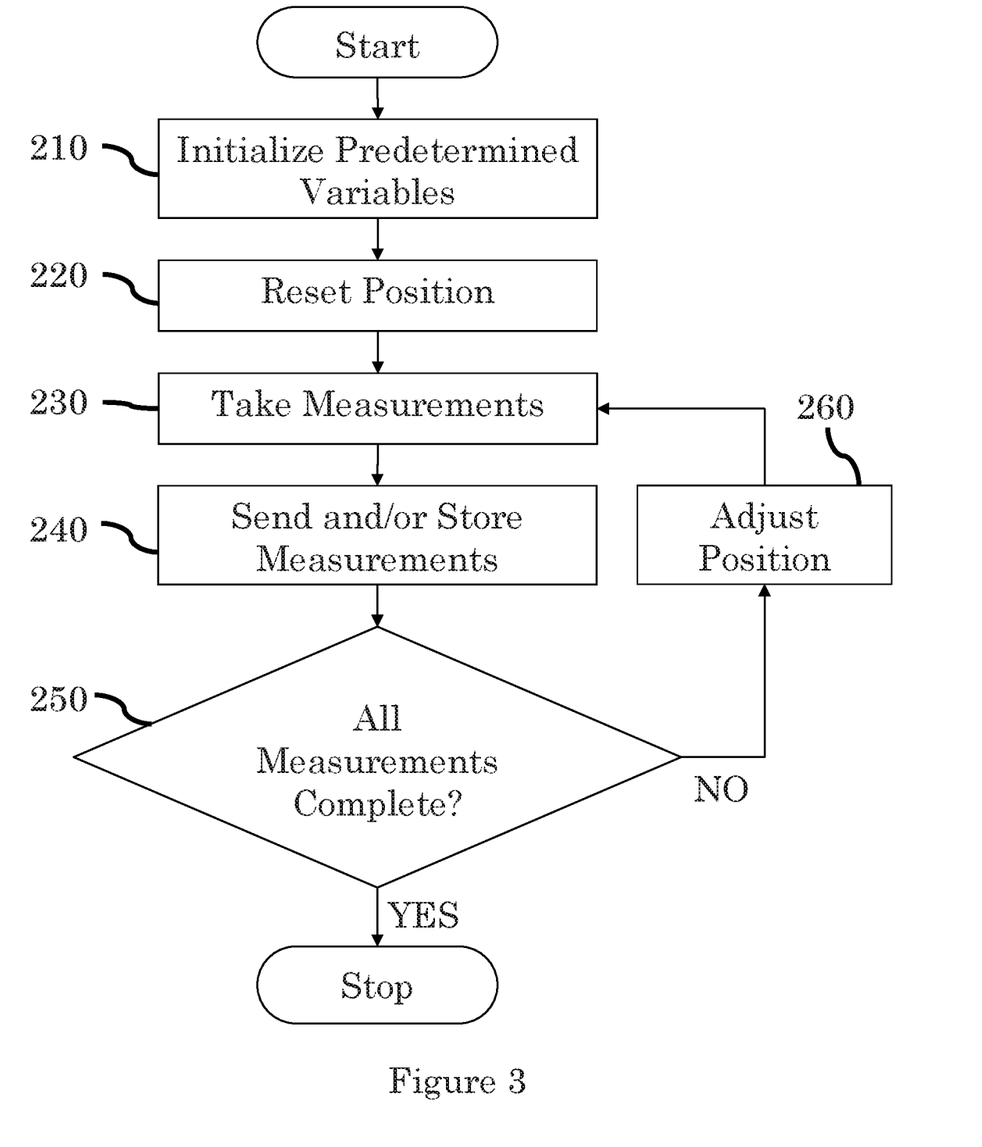
FIG. 3 is a flowchart of an embodiment of the logic used while taking measurements.

FIG. 3 discloses one embodiment for taking measurements with the device. Preferably, a microprocessor would control the actions of the sensor device, but that is not necessary.

First, at step 210 the predetermined variables are all initialized. This is typically accomplished by, but is not limited to, either being entered by a user on a computer or on a keypad on the sensor device, or being read from a location in memory where the variables had been predefined. These predetermined variables may include, but are not limited to, such variables as the field(s) of view of the sensor, orientation of the device, starting position of any motor or actuator used in the two degree-of-freedom motion system, and the maximum positional values of any such motor or actuator. It may also include variables relating to where and how the measurements are to be stored or sent, or what format the data should be utilized.

Once the variables are initialized, the device begins a given set of data points by resetting its position at step 220, possibly to a starting rotation position set as one of the predetermined variables, although that is not required. The first measurement is then made at step 230. As noted previously, the measurement may include several pieces of data, which may include but is not limited to the date and time of the measurement, the angular positioning at which the measurement is being made, the range to the surface being measured, and the temperature of the surface being measured.

Depending on the exact configuration and any predetermined variables, the measurement are then stored or sent to some location in step 240. The wide range of options for how step 240 could be accomplished is well known in the art. These options include, but are not limited to: storage on on-board memory modules, hard drive, or solid state drive; storage on removable media such as a universal serial bus (USB) flash memory device; sending to a separate computer or storage device via ethernet or transmitting to a separate computer or storage device via a wireless connection. The present invention envisions a multitude of possible wireless connections;

A determination is then made as to whether all the measurements are complete. This may be done in numerous ways, which includes but is not limited to verifying if all motors or actuators are at their maximum positional values, or calculating whether the number of measurements made in the set is equal to some value. That value may set earlier in this process, and may be equal to one of the predetermined variables, or, in one preferred embodiment, it may be equal to the value of either (360/FOV)*(180/FOV) or (180/FOV)*(180/FOV), where FOV is the field of view measured in degrees.

If it is determined that all measurements for the current set of data are complete, the process stops. At this point, depending on the configuration of the device, it may be necessary to save any data stored in a temporary storage location. For example, if all the data for the set of measurements was stored in random-access memory (RAM), it may be beneficial to store or send the data to a more permanent storage location.

If it is determined the measurements for the current set of data is not complete, the positioning of or within the two degree-of-freedom motion system is incremented or adjusted in step 260. This may require adjusting or repositioning components within the two degree of freedom motion system to ensure the next measurement is taken at a specific angle or specific distance from the previous measurement. The exact nature of the adjustment will depend on the configuration of the device. The adjustment may involve one or more steps, and includes but is not limited to rotating mirrors, moving an actuator, or rotating a servo motor.

Figure 4:
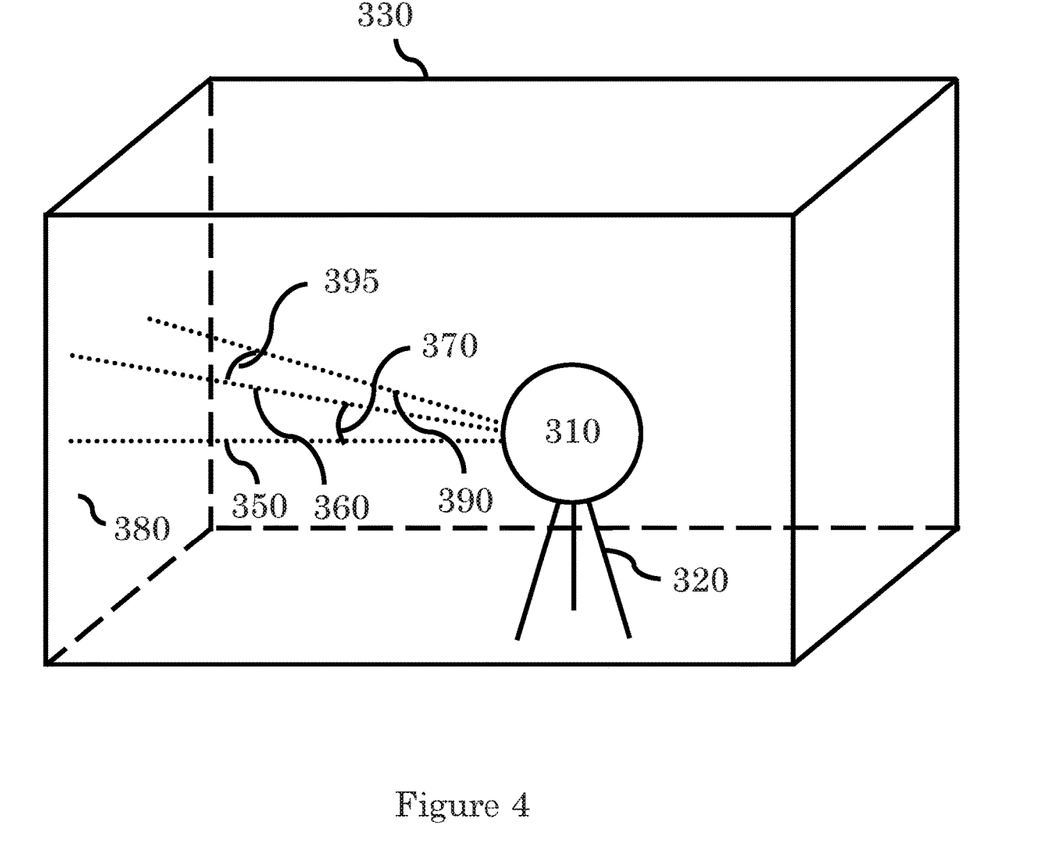
FIGS. 4-5 are diagrams of an embodiment of the present invention.

In FIG. 4, one embodiment of these adjustments are shown. Sensor device 310 is positioned on tripod 320 within space 330. Space 330 may be indoors or outdoors. The centerline 350 of a first sensor reading gathers a data point by measuring one area on surface 380. Once the first sensor reading has been captured, the positioning of the two degree-of-freedom motion system is adjusted such that the second centerline 360 is at an angle 370 relative to the first centerline. In this figure, angle 370 is in the x-z plane. One the second sensor reading has been captured, the positioning of the two degree-of-freedom motion system is adjusted such that the third centerline 390 is at an angle 395 to the second centerline. In this figure, angle 395 is in the x-y plane. In a preferred embodiment, the adjustment amount is configured so that angles 370 and 395, as measured in degrees, is substantially equivalent to the field of view of the sensor in that direction. Thus, in this preferred embodiment, the total number of measurements for a given set of readings, or from a given start time to a given end time, is either (180/FOV)*(180/FOV) or (360/FOV)*(180/FOV) points, where FOV is the field of view, measured in degrees, of the mean radiant temperature sensor.

Note that while adjusting the angle to be essentially equal to the field of view of the sensor is generally preferred, there may be a benefit to using other settings. For example, if the sensor captures images, and those images will be photostitched together at some point, a relatively small amount of overlap of the measured areas (up to 15 to 30%) between one image and the next can be beneficial—thus, in those cases, the angle would need to be adjusted to less than the field of view.

In one example of a preferred embodiment, a sensor with a 5 degree field of view is attached to a two degree-of-freedom motion system comprising a 360 degree continuously rotating servo attached to a 180 degree rotating servo. Starting with both servos at a 0 degree rotation, the 360 degree rotating servo is incremented 5 degrees following each measurement. Whenever the 360 degree rotating servo reaches 360 degrees (i.e., returning to the 0 degree rotation), the 180 degree rotating servo rotates 5 degrees further away from the 0 degree rotation. A measurement is taken, and then 360 degree rotation continues. Thus, the measurements are taken at angular positions (as measured in degrees) of (0,0), (5,0), (10,0) . . . (350,0), (355,0), (0,5), (5,5), (10,5) . . . (350,5), (355,5), (0,10) . . . (355,180), for a total of 2,592 measurement points.

Figure 5:
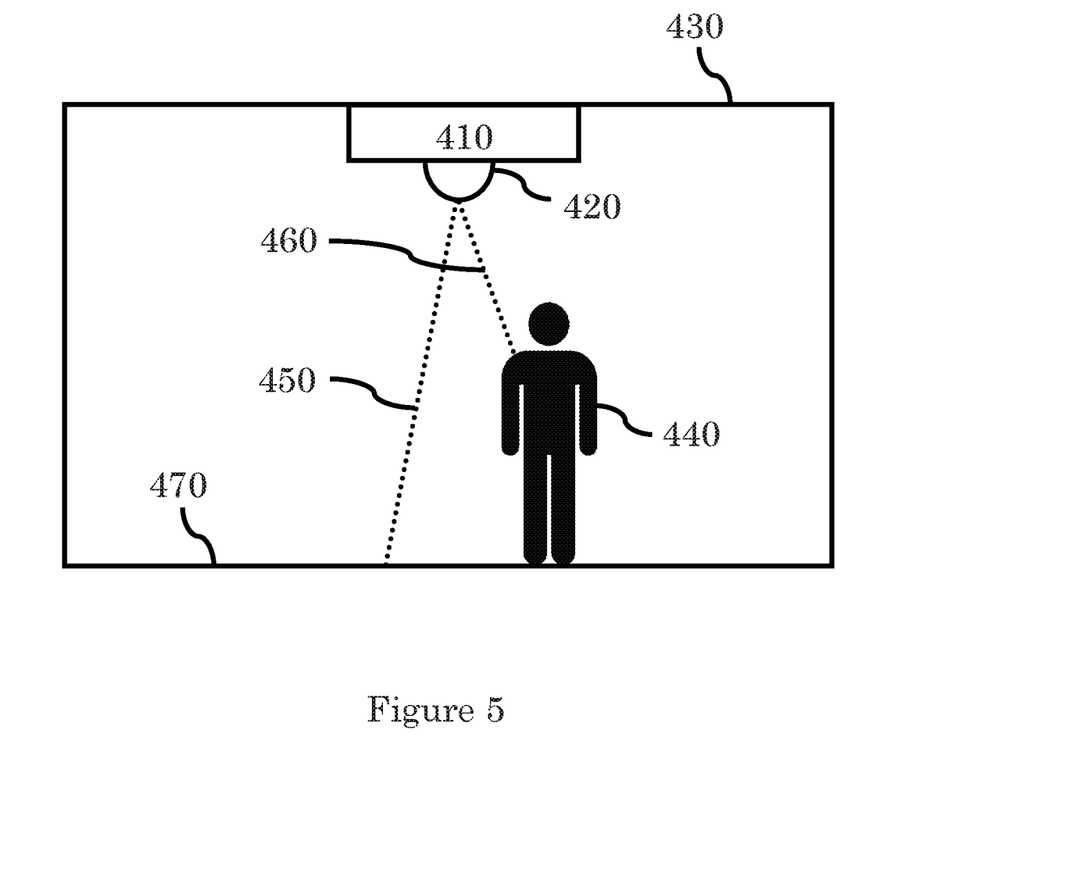

FIG. 5 discloses one embodiment of the present invention. In FIG. 5, sensor device 410 is being used to take measurements of space 430. While only a single sensor device 410 is shown, space 430 may contain multiple sensor devices, each located in appropriate positions in space 430. These multiple sensor devices may communicate among themselves, and/or may communicate with a central control system or unit. Further, space 430 is not required to be an entire room; space 430 may be outdoors, or only a small portion of a room.

In FIG. 5, sensor device 410 has an optional protective or decorative shield 420 in place. The protective or decorative shield 420 may be any appropriate geometry, including but not limited to a hemispherical dome, and may have an opening through which measurements may be taken. The shield 420 may be made of any appropriate material, including polyethylene or polypropylene.

In this embodiment, sensor device 410 may be attached or embedded in any appropriate location that will allow readings of space 430, which includes but is not limited to being attached or embedded in the ceiling, floor, or walls of space 430, or being attached or embedded in a location outside of space 430 that allows measurement of surfaces in space 430. Alternatively, a sensor unit may be temporarily placed in a location for measuring space 430, including but not limited to being attached to a tripod or being placed on a table.

FIG. 5 also shows a sensor device receiving measurements. While FIG. 5 only illustrates two measurements being taken, and the angle between successive centerlines is only illustrated as existing within a single plane, one skilled in the art will recognize that when multiple measurements are made, the angle between successive centerlines may also exist along other planes, and the two degree-of-freedom motion system may be repositioned between measurements in any appropriate fashion as described previously. Typically, a temperature reading 450 is taken of one or more surfaces 470 within or around space 430. In FIG. 5, the surface 470 happens to be a floor, but the surface need not be a single surface, nor a solid surface; any surface capable of reflecting or emitting electromagnetic radiation of a frequency the sensor is designed to receive is envisioned. For example, a sensor could take a measurement of a surface of a water curtain, where the surface may be several individual streams of water. Further, in one embodiment, a temperature reading 460 is received from a surface 470, where the surface 470 is an occupant or object 440.

It must be noted that while in a preferred embodiment, the occupant is a live human being, this is not required. The occupant or object 440 may include, but is not limited to: humans, animals (e.g., at a zoo or in a barn), objects being kept at stable temperatures (e.g., meat in a walk-in meat locker, wine bottles in a wine cellar, or packaging in a pharmaceutical stability test chamber), or sensitive test equipment.

Further, if the occupant is human or animal, the reading may be from any portion of the occupant's body, and may include either clothed or unclothed portions of the occupant's body.

Figure 6:
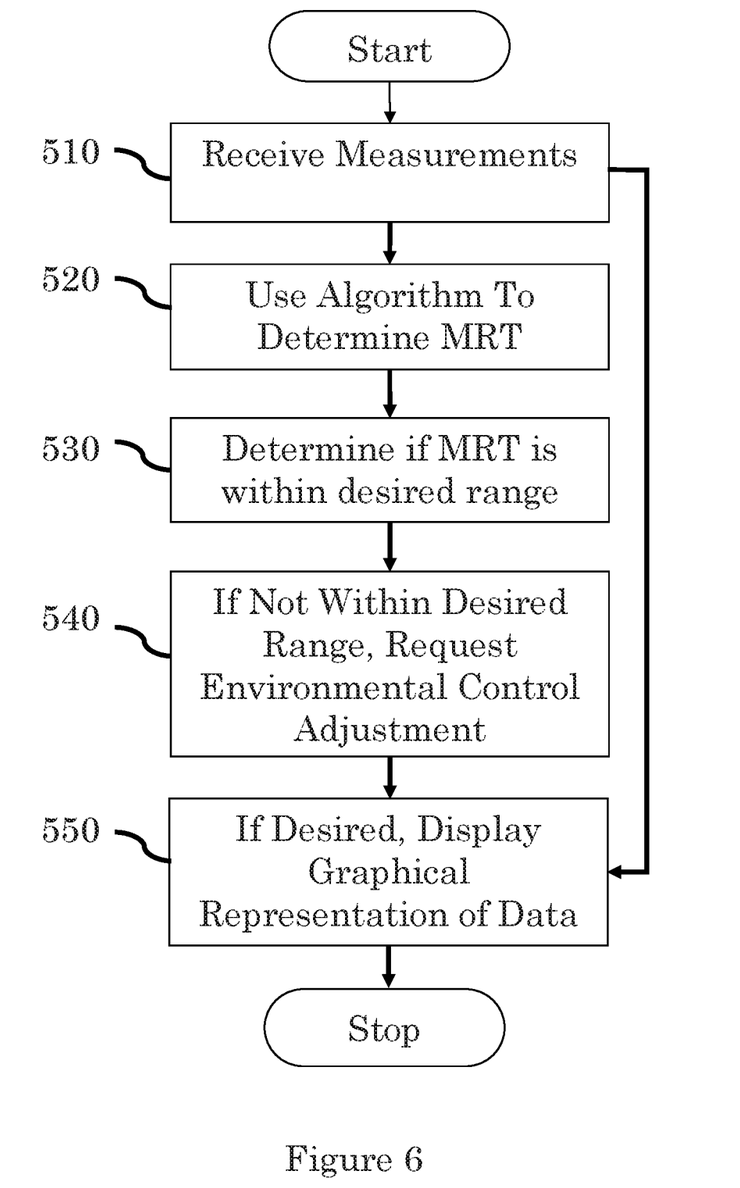
FIG. 6 is a flowchart describing an embodiment making calculations and displays based on the measurements.

Referring now to FIG. 6, there are additional steps that could be taken to provide additional benefit for users. First, the measurements must be received in step 510. This may take many forms, including but not limited to sending the data to a microprocessor onboard the sensor unit, sending the measurements to a computer wirelessly or through an ethernet cable, or by removing storage media from the sensor unit and plugging it into a computer.

Once the measurements have been received, step 520 requires the use of an algorithm to determine the mean radiant temperature of a space. The algorithm utilizes a latitudinal and longitudinal weighting procedure. Numerous variations can be utilized here; for example, weighting can occur for a standard sphere, such as a standard globe thermometer, to determine the measurement a globe thermometer would record without wind, or elongated to an ellipsoid or another shape to mimic the perception of a human body. One preferred embodiment uses the following latitudinal and longitudinal weighting scheme:

Latitudinal Weighting

Weighting latitudinal measurements requires knowing the relative area of a set of latitudinal measurements on the imaginary sphere's surface compared to the surface area of the entire sphere. To do this, use r to represent the radius of the sphere, θ to be the 0 to 360°, or θ to 2π, azimuthal angle, and φ to represent the angle of inclination, ranging from 0 to 180°, or 0 to π radians. Additionally, use δ to represent the field of view of the sensor. Since angles and relative surface area are involved, the relative surface area of a ring compared to the overall spherical surface area will be the same regardless of radius, so the choice of radius should not matter. If one divides the sphere into latitudinal segments equal to δ, then there are 180/δ latitudinal regions. More precise treatment to the algorithm must be given if 180 is not a multiple of δ. To calculate a relative weighting factor for radiant temperature measurements in an arbitrary latitudinal ring, the following formula is employed.

$$\frac{2\pi r^2 \int_{\varphi}^{\varphi+\delta} \sin x dx}{4\pi r^2} = \frac{1}{2}\int_{\varphi}^{\varphi+\delta} \sin x dx = \frac{1}{2}[-\cos x]_{\varphi}^{\varphi+\delta} \quad \text{(Eq. 1)}$$

This works for any sphere of radius r, and the equation inside the initial integrand can be changed to allow for the weighting of an ellipsoid (to simulate a human body) or any other shape with known equation.

Longitudinal Weighting

For the same coordinate system, it should be known the size of the path carved out in the azimuthal rotation compared to the field of view to determine the longitudinal weighting scheme. For example, in the latitudinal band from 0 to δ, even for small δ there is significant overlap between measurements. Therefore one must determine the average circumference of the latitude given by $$2\pi r^2 \sin\left(\frac{\varphi+\varphi+\delta}{2}\right)$$

and the number of divisions separated by the field of view, given by $$\frac{360}{\delta}$$

Therefore, each measurement should be weighted by simply multiplying each measurement by $$\frac{2\pi r^2 \sin\left(\frac{\varphi+\varphi+\delta}{2}\right)}{\frac{360}{\delta}} \quad \text{(Eq. 2)}$$

to reduce the weight of each measurement by the fraction desired. Then, the same fraction of wedges symmetrically before and after must be added until the field of view is composed of fractional measurements.

Final Algorithm

In this scenario, longitudinal weighting occurs first to create a new array of values, followed by latitudinal weighting, although that is not required.

Weighting scenarios do not require a fixed number of data points, generally a (360/FOV)*(180/FOV) or (180/FOV)*(180/FOV), where FOV is measured in degrees, maximum number of points. The number of points is specific to the latitudinal and longitudinal weighting scheme. The disclosed approach is not limited by geometries or weighting schemes. Points have been developed for other options, including but not limited to using the sensor to measure with equal weights (geodesic distribution with points depending on the FOV), as well as a sweeping motion where measurements are only taken after the sensor travels a path that defines a unique view, given simply by Eq. 2. Additionally, the weighting algorithms are not limited to the above mentioned sensor information. For example, range information or other sensor data may be included in the weighting schemes above to further refine the MRT calculation.

Other latitude and longitude weighting schemes are envisioned. For example, another weighting scheme uses a geodesic measurement distribution. In such a scenario, measurements of surface temperature, distance, and servo or mirror positions are taken only after the sensor have traversed a predetermined distance. This distance is given by the following formula.

$$360 \times \frac{\tan\left(\frac{FOV}{2}\right)}{\pi \cos\theta} \quad \text{(Eq. 3)}$$

wherein FOV is the field of view of the sensor, measured in degrees, and θ to be the 0 to 360°, or 0 to 2π, azimuthal angle of rotation. This formula calculates the distance that needs to be traversed such that there is no overlap between readings. The benefit to this geodesic pattern is that the MRT is simply the average of all readings for a full measurement, and there is no need for additional weighting. We expect this equation can be used to produce measurements that are in constant longitudinal steps, but horizontal steps differ as given by Eq. 3.

Once the MRT has been determined in step 520, it can then be displayed to a user, either on a computer display or on a display on the sensor device. Further, in step 530, a determination can be made as to whether the MRT is within a desired range. Preferably, this would be the comfortable range for humans, which is well understood in building science. However, depending on the purpose of the space, that may not be the appropriate range.

If the MRT is not within the desired range, step 540 involves requesting a change in the environmental controls for the space. Control systems are well known in the arts; and how this is accomplished will depend on the configuration of the systems involved. Preferably, a signal containing at least the MRT is required to be sent to a separate control unit. In spaces involving multiple sensor devices, such a configuration would likely be required, as conflicts between signals could be confusing for an environmental system (e.g., if a device on one side of a space is requesting the temperature be raised while a second device on the opposite side of the space is requesting the temperature be lowered). However, as one alternative, a microprocessor on the sensor device could compare the MRT with a predefined target MRT, determine the appropriate change in temperature, and send a signal to a separate control unit requesting that the temperature in the space be raised or lowered by an appropriate amount.

Other factors and communication between sensor units is envisioned as well. As one example, the microprocessor on a sensor device could first determine whether there are occupants near the sensor, or how many occupants are near the sensor. If so, the microprocessor would determine if the occupants are comfortable based at least partially on the MRT. If not, the sensor unit would communicate with any surrounding sensor units to determine what adjustments should be made. If all the sensors with occupants near them have MRTs that are too warm for comfort, the temperature would need to be lowered by an amount that would keep most people in the comfort zone. But if there is a conflict, the determination could be made by giving weight to the number of occupants near each sensor, i.e., if most people are too warm, and only a handful are too cold, the temperature would be lowered to an amount that kept the most people comfortable. Depending on the configuration of the environmental system, the microprocessor may simply adjust the temperature setting directly, or may request that the temperature setting be adjusted by a certain amount.

If desired, and exclusive of other steps, once the measurements have been received, step 550 may occur and a graphical representation of the data may be displayed. In an industrial setting, this is done at a centralized location, such as on the computer of a facilities manager. The display may be a two-dimensional map, or a three-dimensional representation of the surfaces and surface temperatures in the space. The software requirements for graphically displaying data are well known in the arts. This device and system enable, among other features, near real-time generation of graphical displays of a given space, allowing a user to make determinations about how well a facility's heating ventilation and air-conditioning (HVAC) system is functioning, or to predict or prevent HVAC problems from occurring or respond quickly when such problems do arise.

A system for determining mean radiant temperature is also disclosed. The system includes a non-contacting infrared temperature sensor and a two degree-of-freedom motion system. However, the two degree of freedom motion system may be comprised of a first and second rotating component, each adapted to revolutions of up to at least 90 degrees on a first and second plane to the sensor, respectively. In a preferred embodiment, the two rotating components rotate 180 degrees and 360 degrees, respectively.

The system also includes a microprocessor. The microprocessor may be an onboard chip or on a separate computer. The microprocessor is adapted to direct the two rotating components such that sensor measurements can be taken comprising all or a fraction of the surface of an imaginary sphere surrounding the device. This is typically accomplished using a method of alternatively taking a reading, and as previously described, preferably in accordance with FIG. 3.

The rotating components may be any two components that, together, provide a motion system having two degrees-of-freedom. This may include, but is not limited to, two rotating servos coupled to each other, or a pair of rotating mirrors, where each mirror is coupled to an electric motor.

The microprocessor is also adapted to receive at least a temperature reading and determine directional information corresponding to each temperature reading. This may be accomplished simply by reading the positional information of the two degree-of-freedom motion system with the temperature reading taken at that position. As one alternative example, the temperature readings and positional data may be sent from a sensor device to a computer wherein the data packet or packets being sent contain the temperature reading and positional data. In such a case, the microprocessor must utilize an appropriate algorithm for reading the appropriate data in the data packet(s), based on the format of the packets. The microprocessor then calculates a mean radiant temperature as a weighted average of the received temperature data points, per a method as described previously, and outputs the mean radiant temperature.

This system may also comprise a range finding sensor, wherein the microprocessor is further adapted to receive a range data point from the range finding sensor corresponding to each temperature reading. That range data may optionally factor into the calculation of the mean radiant temperature.

The mean radiant temperature may also optionally incorporate one or more sensors. In such cases, the algorithm may utilize a filter for a given temperature reading to determine whether identical or overlapping surface temperature readings are being presented. This filter may involve the known location of the sensors along with the positional data, and preferably also range data. In one embodiment, such an algorithm uses the known location of the sensors, the positional and range data for a given temperature reading to determine an absolute position within a given space. The absolute position for each temperature reading for all sensors within a given space is determined. As each position is being determined, the distance to all other known absolute positions already determined is calculated. If that distance is determined to be within the field of view of the sensor, it is considered to "overlap". In such cases, the algorithm may deal with the identical or overlapping readings in an appropriate manner, including but not limited to averaging them or selecting the highest or lowest temperature recorded.

This system may also include a display for outputting a plot comprising the temperature readings. Preferably, the plot will display a three-dimensional representation of the surface temperature data within a given space, and may incorporate data from one or more sensors. Graphing software is well known in the industry. One skilled in the art will recognize that the use of any appropriate graphing software, whether commercially available or developed specifically for this system, is envisioned.

Various modifications and variations of the invention in addition to those shown and described herein will be apparent to those skilled in the art without departing from the scope and spirit of the invention, and fall within the scope of the claims. Although the invention has been described in connection with specific preferred embodiments, it should be understood that the invention as claimed should not be unduly limited to such specific embodiments.

What is claimed is:

1. A mean radiant temperature sensor device, comprising:
   a microprocessor;
   a two degree-of-freedom motion system;
   a range finding sensor configured to measure a range to a surface within a space being measured; and
   a non-contacting temperature sensor configured to measure a temperature of the surface,
   wherein the range finding sensor and the non-contacting temperature sensor are operably connected to the two degree-of-freedom motion system, and
   wherein the non-contacting temperature sensor and range finding sensor are directed using the two degree-of-freedom motion system such that the measured temperature and corresponding range measurements can be collected comprising all or a fraction of the surface of an imaginary sphere surrounding the device, and wherein the microprocessor is configured to calculate a mean radiant temperature of at least one point within the space being measured based on the measured temperature of the surface and a distance from the at least one point to the surface; and wherein the microprocessor is configured to output the mean radiant temperature to a display, to a data storage unit, or a combination thereof.

2. The mean radiant temperature sensor device of claim 1, wherein the two degree-of-freedom motion system comprises a first rotating servo adapted to rotate in a first plane;
a second rotating servo mounted to the first rotating servo, and adapted to rotate in a second plane orthogonal to the first plane; and
the non-contacting temperature sensor is mounted to the second rotating servo,
wherein the first and second rotating servos are independently either up to a 180 degree rotating servo, or a 360 degree rotating servo.

3. The mean radiant temperature sensor device according to claim 2, wherein a 360 degree rotating servo rotates in a first plane and a 180 degree rotating servo rotates in a second plane orthogonal to the first plane.

4. The mean radiant temperature sensor device of claim 1, wherein the two degree-of-freedom motion system comprises at least one mirror,
wherein the at least one mirror is adapted to rotate around at least one unique axis, and
wherein the at least one mirror is adapted to direct infrared light radiating from the surface towards the non-contacting temperature sensor.

5. The mean radiant temperature sensor device according to claim 1, further comprising a power supply.

6. The mean radiant temperature sensor device according to claim 1, wherein the device comprises a data storage unit, and the device further comprises a data transceiver unit configured to operably couple the microprocessor and the data storage unit.

7. The mean radiant temperature sensor device according to claim 1, wherein the number of measurements the non-contacting temperature sensor makes between a start time and an end time is either (180/FOV)*(180/FOV) or (360/FOV)*(180/FOV) points, where FOV is the field of view of the non-contacting temperature sensor, measured in degrees.

8. The mean radiant temperature sensor device according to claim 1, further comprising a protective cover.

9. The mean radiant temperature sensor device according to claim 8, wherein the protective cover has an opening through which the sensor measurement is directed.

10. A method of measuring mean radiant temperature, comprising the steps of:
a. providing a sensor device for measuring a space containing at least one surface, comprising a non-contacting temperature sensor and a range finding sensor operably connected to a two degree-of-freedom motion system;
b. determining a first rotation angle for the two degree-of-freedom motion system;
c. recording a surface temperature measurement of the at least one surface from the non-contacting temperature sensor and a range from the range finding sensor at the first rotation angle for the two degree-of-freedom motion system;
d. incrementing the two degree-of-freedom motion system by a predetermined amount;

e. repeating steps c and d until a predetermined number of data points have been collected or the two degree-of-freedom motion system has reached a defined limit;
f. calculating the mean radiant temperature of at least one point within the space being measured by employing a latitudinal and longitudinal weighting procedure to weigh the collected data points; and
g. automatically adjusting environmental conditions in the space based on the calculated mean radiant temperature.

11. The method of claim 10, wherein the predetermined amount of incrementing is equal to the field of view for the temperature sensor.

12. The method of claim 11, further comprising mapping the collected data points.

13. The method of claim 10, further comprising determining the surface geometry of the measured space, the surface geometry comprising the location of each measured surface within the measured space, the surface geometry determined based on the collected data points including a plurality of measured ranges;
using the determined surface geometry information and the surface temperature measurement to determine the mean radiant temperature at substantially all positions in the space; and
compiling a three-dimensional representation of the mean radiant temperature, a surface temperature profile of the space, or a combination thereof, based on the determined surface geometry.

14. The method of claim 10, further comprising predicting whether a human within the measured space would be comfortable, based on a mean radiant temperature determined by weighting the collected data points for a standard sphere, elongated to an ellipsoid or another shape, or a combination thereof,
wherein the collected data points comprise a plurality of recorded surface temperatures and ranges.

15. The method of claim 10, further comprising:
detecting a skin temperature of an individual physically present in the space using the non-contacting temperature sensor, or estimating the skin temperature of the individual using a mean radiant temperature based on the collected data points, the collected data points comprising a plurality of recorded surface temperatures and ranges; and
automatically adjusting environmental conditions in the space as a result of a determination that the skin temperature of the at least one individual physically present in the space is not within an acceptable range.

16. The method of claim 10, wherein a user is presented with an overall measurement of the observed mean radiant temperature.

17. The method of claim 10, wherein weighting can be customized to provide information about how non-spherical bodies will perceive the radiant temperature.

18. A mean radiant temperature measurement system to calculate mean radiant temperatures, comprising:
a non-contacting infrared temperature sensor;
a range finding sensor;
a first rotating component operably connected to the non-contacting infrared temperature sensor and range finding sensor, the first rotating component adapted to revolutions of up to at least 90 degrees on a first plane to the non-contacting infrared temperature sensor and range finding sensor;
a second rotating component operably connected to the non-contacting infrared temperature sensor and range finding sensor, the second rotating component adapted to perform revolutions of up to at least 90 degrees on a second plane to the non-contacting infrared temperature sensor and range finding sensor; and a microprocessor;

wherein the microprocessor is adapted to direct the two rotating components such that sensor measurements can be taken comprising all or a fraction of the surface of an imaginary sphere surrounding the system, and wherein the microprocessor is adapted to receive at least a temperature reading, determine directional information corresponding to each temperature reading, calculate a mean radiant temperature as a weighted average of the received temperature data points, and output the mean radiant temperature.

19. The system of claim 18, further comprising a data storage unit, wherein the microprocessor is further adapted to store the temperature readings and the directional information corresponding to each temperature reading on the data storage unit.

20. The system of claim 18, further comprising a range finding sensor, wherein the microprocessor is further adapted to receive a range data point from the range finding sensor corresponding to each temperature reading.

21. The system of claim 18, further comprising wherein the microprocessor is configured to generate a plot based on the received temperature data points; and the system further comprises a display for outputting the plot.

* * * * *